Feb. 10, 1942. E. F. RIESING 2,272,897
LEVER FOR MANUAL OPERATION
Filed Dec. 14, 1939
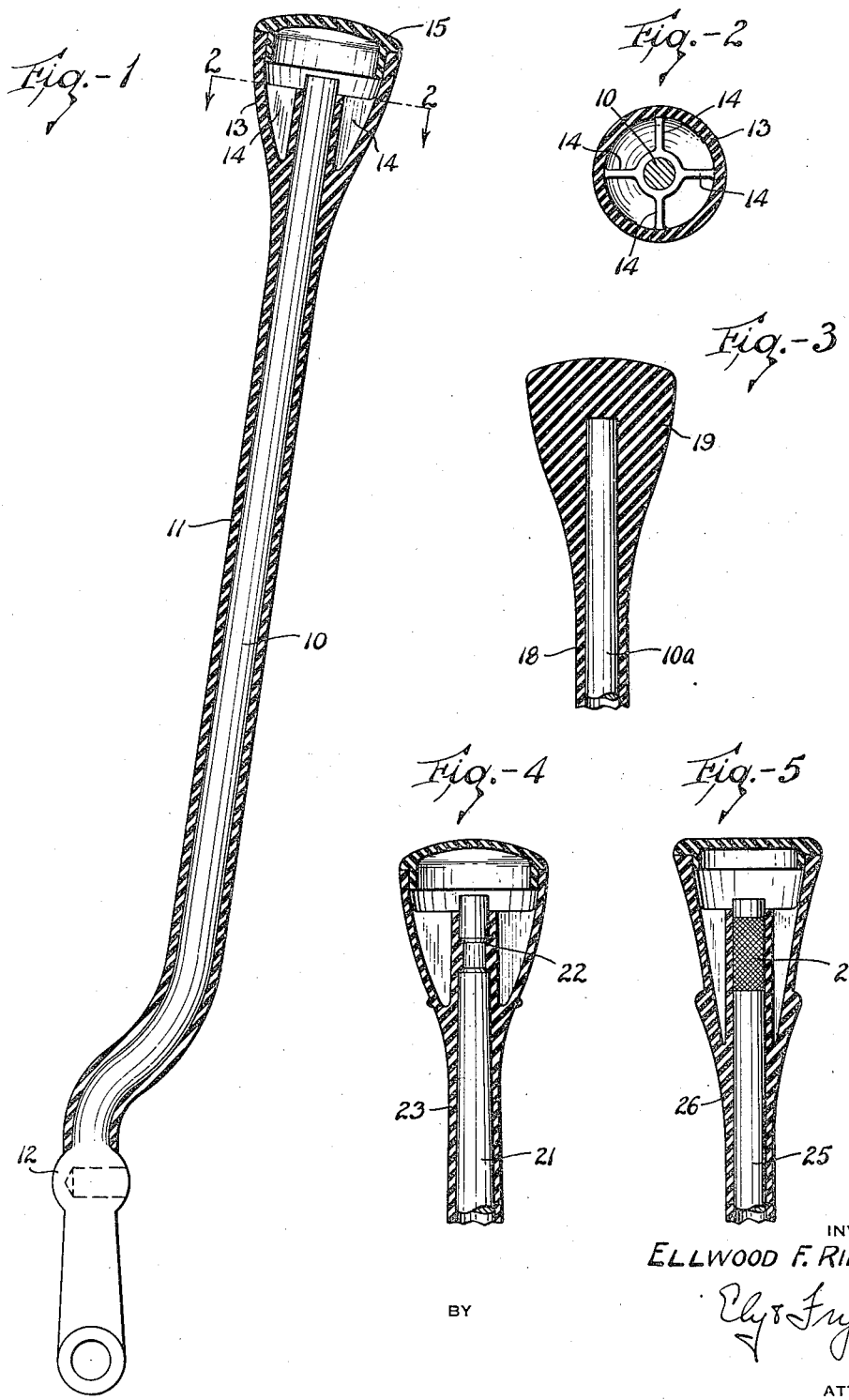
INVENTOR
ELLWOOD F. RIESING
BY
ATTORNEYS Patented Feb. 10, 1942

2,272,897

UNITED STATES PATENT OFFICE 2,272,897

LEVER FOR MANUAL OPERATION

Ellwood F. Riesing, Akron, Ohio, assignor to The Firestone Tire & Rubber Company, Akron, Ohio, a corporation of Ohio Application December 14, 1939, Serial No. 309,200

3 Claims. (Cl. 74—523)

This invention relates to levers or similar structures adapted for manual operation, and more especially it relates to operating levers having hand-grip portions on one end thereof.

The invention is usefully employed, for example, as a gear-shift lever in a motor vehicle, especially in cases where the gear-shift lever is mounted on the steering post of the vehicle. Such levers heretofore commonly have been made in two parts, with a separable knob or hand-grip portion threaded onto an end of the lever. The latter usually was plated with nickel or chromium, and required the costly operations of grinding and polishing to prepare it for plating. The same expensive preparatory operations were required in cases where the lever was coated with enamel or paint. The lever also required to be threaded, as did the separable knob, which operations contributed to the increased cost of the finished article.

The chief objects of this invention are to provide a lever of the character mentioned that will be less costly than similar levers heretofore provided; and that will have a more pleasing appearance than prior structures. Other objects will be manifest as the description proceeds.

Of the accompanying drawing:

Figure 1 is a longitudinal section through a gear-shift lever constituting one embodiment of the invention;

Figure 2 is a section on the line 2—2 thereof;

Figure 3 is a diametric section through the hand-grip portion of another embodiment of the invention; and Figures 4 and 5 are similar sections through the hand-grip portions of two other embodiments of the invention.

Briefly stated, the gear-shift lever of the invention comprises a body portion of metal, such as a steel forging, and a molded cover or sheath thereon, said cover having a bulbous enlargement at one extremity of the lever, which enlargement constitutes a hand-grip portion. The bulbous enlargement and lever cover are a unitary structure, and the said enlargement may be hollow or solid as desired. The covering material may consist of heat-hardened material such as "Bakelite" or hard rubber, or it may consist of thermoplastic material such as "Tenite" which is a cellulose acetate composition. It will be understood, however, that the available compositions are not limited to those mentioned, but that other moldable compositions may be found to be suitable for the purpose. When "Bakelite" or "Tenite" are used as cover materials, the metal body portion of the lever preferably is zinc plated to improve the bond between the metal and cover material.

Referring now to Figure 1 of the drawing, the metal forging constituting the body portion of the lever is indicated at 10, and the sheath or cover therein as a whole is designated 11. The lever body 10 usually is formed with a local enlargement 12 at its fulcrum, and the cover 11 covers the long arm of the lever and terminates at its inner end against said enlargement 12. At the opposite end of the lever the cover 11 terminates in a bulbous enlargement 13 that provides a hand-grip for manual operation of the lever. The enlargement 13 as shown is hollow, which is the preferred construction when the cover is composed of thermoplastic material such as "Tenite." Interiorly, the hollow enlargement 13 is formed with a plurality of radial reinforcing ribs or webs 14, 14. In the manufacture of the lever, the hollow interior of the bulbous enlargement 13 is produced by means of a core that subsequently is withdrawn therefrom through an opening in the end thereof, said opening thereafter being closed by means of a cap 15 that is cemented or otherwise permanently secured in place.

The "Tenite" cover 11 and knob 13 may be of any desired color to conform to the color scheme of the vehicle, or its upholstery or accessories. If desired, the coloring of the "Tenite" cover may be effected by painting the metal body structure 10 with a paint of suitable color before the plastic composition is molded thereon, the translucent character of the latter enabling the color to show through. After the molding operation, the inner surface of the bulbous enlargement 13 may be painted, as also may be the inside of the cap 15. This gives to the bulbous enlargement an attractive color and also an illusion of depth. The shape of the knob may be varied within limits, and its graceful lines merging with the cover 11 of the lever body 10 enhance the appearance of the assembly.

In the embodiment of the invention shown in Figure 3, the lever body 10a is identical with the lever body 10 previously described, but the cover 18 and unitary terminal enlargement or knob 19 is of heat-hardened material such as "Bakelite" or hard rubber. Furthermore, the knob 19 is solid instead of hollow. In the manufacture of covered levers of this type, the cover and knob are molded and partly hardened in longitudinal half-sections, the latter thereafter being assembled upon the metal lever body 10a and united therewith and with each other by pressure and heat in a suitable mold. This form of the invention also could be manufactured by anchoring both ends of the lever body while plastic is molded therearound, withdrawing the core anchoring the end of the lever body with which the enlargement is associated and then plugging the hole left by this core.

The embodiments of the invention shown in Figures 4 and 5 differ from those previously described in that the metal body of the lever is so shaped as to provide a mechanical interlock with the cover material and thereby to secure a superior union of the latter and the metal. Thus in the structure shown in Figure 4, the metal lever body 21 is formed with a circumferential groove 22 adjacent its operating end, the cover material 23 of the lever filling said groove and obviating the possibility of stripping the knob and cover from the lever. In the structure shown in Figure 5 the interlock between the metal lever body 25 and cover material 26 is effected by means of knurling 27 on the lever body near an end thereof.

Other modification may be resorted to without departing from the spirit of the invention or the scope thereof as defined by the appended claims.

What is claimed is:

1. A gear shift lever for motor vehicles, said lever comprising an elongated metal body structure, and a molded non-metallic cover mounted thereon and bonded thereto, said cover being integrally formed at one end of the structure with a hollow enlarged portion that has an opening therein, one end of the metal body being disposed within said hollow portion and projecting from the cover material and the other end of the metal body projecting from the cover material whereby said body may be anchored at both ends while the cover material is being applied thereto, and a cap secured in the opening of said hollow portion to close the same.

2. A gear shift lever for motor vehicles, said lever comprising a metal body structure having a fulcrum formation adjacent one end thereof dividing the lever into two arms, an integral non-metallic cover extending around one arm of said lever for substantially the entire length thereof and mechanically bonded thereto, said cover having a hollow bulbous enlargement constituting a hand grip portion formed thereon intermediate the ends thereof and extending axially beyond the free end of said lever arm, said cover having an extended portion within said bulbous enlargement in intimate contact with said lever arm but exposing the free end thereof and having ribs extending between said extended portion thereof and said bulbous enlargement, and a cap secured to the end of said bulbous enlargement to enclose the free end of said lever arm completely.

3. A gear shift lever for motor vehicles, said lever comprising a metal body structure having a fulcrum formation adjacent one end thereof dividing the lever into two arms, an integral non-metallic cover extending around one arm of said lever for substantially the entire length thereof and mechanically bonded thereto to prevent any relative movement therebetween, said cover having a hollow bulbous enlargement constituting a hand grip portion formed thereon intermediate the ends thereof and extending axially beyond the free end of said lever arm, and a cap secured to the end of said bulbous enlargement to enclose the free end of said lever arm completely.

ELLWOOD F. RIESING.